(12) United States Patent
Matsunaga

(10) Patent No.: US 7,720,007 B2
(45) Date of Patent: May 18, 2010

(54) TELECOMMUNICATIONS SYSTEM FOR DETERMINING THE PROBABILITY OF AND AVOIDING COLLISION BETWEEN DATA TRANSMISSIONS

(75) Inventor: Toshihiko Matsunaga, Osaka (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 798 days.

(21) Appl. No.: 11/315,218

(22) Filed: Dec. 23, 2005

(65) Prior Publication Data

US 2006/0153223 A1 Jul. 13, 2006

(30) Foreign Application Priority Data

Dec. 27, 2004 (JP) ............................. 2004-377626

(51) Int. Cl.
*H04L 12/28* (2006.01)
(52) U.S. Cl. ........................................ 370/255; 370/400
(58) Field of Classification Search ................ 370/255, 370/328, 389, 400, 445, 462, 503, 522, 913; 455/60, 522; 709/238
See application file for complete search history.

(56) References Cited

U.S. PATENT DOCUMENTS

| | | | | |
|---|---|---|---|---|
| 6,175,722 | B1 * | 1/2001 | Ashkenazi | 455/62 |
| 6,188,286 | B1 * | 2/2001 | Hogl et al. | 331/2 |
| 6,456,599 | B1 * | 9/2002 | Elliott | 370/254 |
| 6,574,456 | B2 * | 6/2003 | Hamabe | 455/63.3 |
| 6,714,611 | B1 * | 3/2004 | Du et al. | 375/356 |
| 6,735,448 | B1 * | 5/2004 | Krishnamurthy et al. | 455/522 |
| 6,956,441 | B2 * | 10/2005 | Matsumaru et al. | 331/1 A |
| 6,970,714 | B2 * | 11/2005 | D'Souza et al. | 455/522 |
| 7,035,207 | B2 * | 4/2006 | Winter et al. | 370/225 |
| 7,174,387 | B1 * | 2/2007 | Shand et al. | 709/238 |
| 7,177,295 | B1 * | 2/2007 | Sholander et al. | 370/338 |
| 7,330,449 | B2 * | 2/2008 | Takahashi et al. | 370/331 |
| 7,342,876 | B2 * | 3/2008 | Bellur et al. | 370/221 |
| 7,421,051 | B2 * | 9/2008 | Sugaya et al. | 375/356 |

OTHER PUBLICATIONS

Jun et al., "The Nominal Capacity of Wireless Mesh Networks", Oct. 2003, IEEE Wireless Communications, p. 8-14.*
Y. Matsushita et al., "Wireless LAN Architechture", pp. 47, 53-59 and 69, Kyoritsu Shuppan Co., Ltd., Tokyo, Japan, 1996.

* cited by examiner

*Primary Examiner*—Dang T Ton
*Assistant Examiner*—Brian O'Connor
(74) *Attorney, Agent, or Firm*—Rabin & Berdo, P.C.

(57) ABSTRACT

In a transmission timing control apparatus, a state variable signal affected by a phase representing the data transmission timing of a neighboring node is used to determine the data transmission timing of the own node. A node information transmitter/receiver transmits source identification information particular to the own node and source node information of a data signal received by the own node, and receives node information transmitted from the neighboring node. A neighboring node information collecting circuit collects neighboring node information of all neighboring nodes having received data signals, based upon the source identification information received by the node transmitter/receiver and the source node information. A collision determination circuit compares in number neighboring nodes to which the transmission timing determining circuit is related as to the control of the data transmission timing with nodes based on the all neighboring node information to determine the probability of a collision between data transmissions.

24 Claims, 10 Drawing Sheets

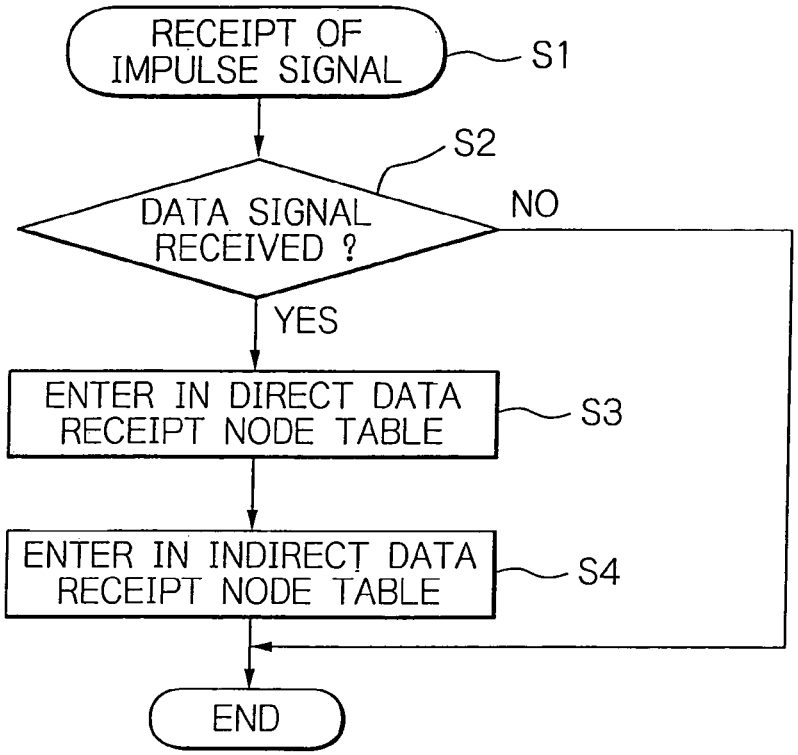
Fig. 5
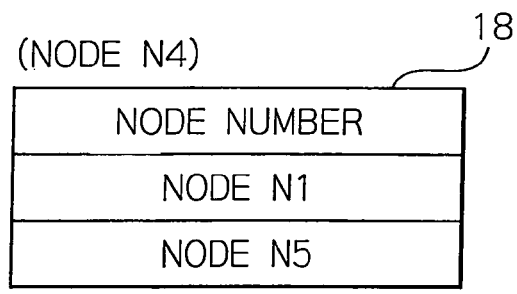
Fig. 6A
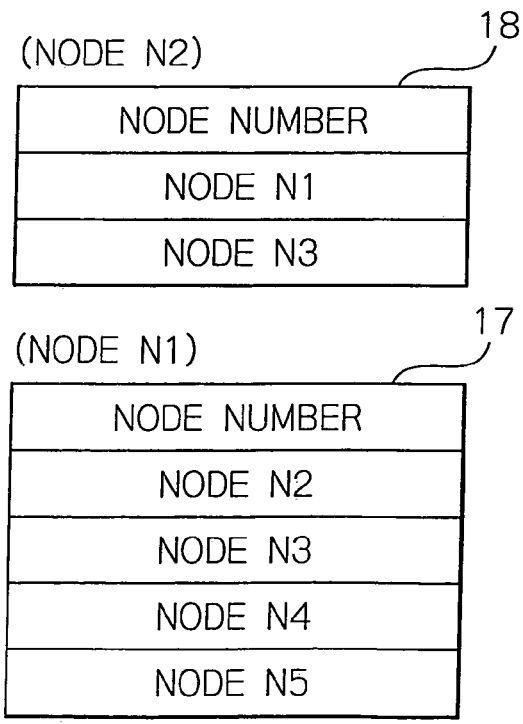
Fig. 6B
Fig. 6C

TELECOMMUNICATIONS SYSTEM FOR DETERMINING THE PROBABILITY OF AND AVOIDING COLLISION BETWEEN DATA TRANSMISSIONS

BACKGROUND OF THE INVENTION

1. Field of the Invention

The present invention relates to a telecommunications system, and more specifically to a transmission timing control apparatus that can be mounted on, or applicable to, communication nodes disposed in the form of, e.g. a sensor network, a mobile communications network or a local area network (LAN) to be spatially apart from each other.

2. Description of the Background Art

In order to allow such nodes spatially distributed to transmit data without colliding with each other, a time division multiple access (TDMA) system and a carrier sense multiple access (CSMA) system, such as a carrier sense multiple access with collision avoidance (CSMA/CA) system or a carrier sense multiple access with collision detection (CSMA/CD) system are available, as taught by Y. Matsushita et al. "Wireless LAN Architecture", pp. 47, 53-59 and 69, Kyoritsu Shuppan Co., Ltd., Tokyo, Japan, 1996.

A problem with the TDMA system is that when an error occurs in a central control server the entire telecommunications system goes down. In light of this, there have been proposed various methods of allowing each of the nodes to mutually adjust its time slots by itself in a distributed coordination fashion without resorting to a central control server for thereby avoiding a collision between communication data. In accordance with such methods, each node periodically transmits and receives impulse signals with neighboring nodes for thereby mutually adjusting the allotment of time slots.

More specifically, each node uses a numerical formula modeling nonlinear oscillation to adjust the timing for transmitting an impulse signal in accordance with the timings at which the other nodes transmit input signals. Each node can therefore execute the adjustment in such a fashion that the timing for transmitting its own impulse signal is apart from the timings of the other nodes for transmitting impulse signals as far as possible, implementing the acquisition of time slots in a distributed coordination fashion.

When the communication control method stated above is applied to a radio or wireless communication environment, it is necessary to solve the problem of so-called hidden terminals. For that aim, the transmission output strength is controlled in such a manner that a transmitted timing signal in the form of impulse propagates over a range twice or more as broad as the propagation range of a data signal. For example, FIG. 2 shows the propagation ranges of data signals indicated by solid lines 31 and the propagation range of a transmitted timing signal indicated by a dotted line 33. By designing each of the propagation ranges 33 of timing signals transmitted from nodes N1, N2 and N3 twice or more as broad as the propagation ranges of a data signal, the nodes N1 and N3 are successfully prevented from simultaneously sending out data toward the node N2. In this manner, the nodes N1 through N4 interact with each other to control the data signal transmission timings thereof.

However, even if the transmission output strength is selected such that the propagation range 33 of a transmitted timing signal is twice or more as broad as the propagation range 31 of a data signal, it is likely that the former is not twice or more as board as the latter in an environment, e.g. where an electromagnetic wave sent from a node is attenuated by an obstacle. For example, as shown in FIG. 2, although the node N4 is able to receive data signals from both of the nodes N1 and N5, the node N5 stays outside the timing signal propagation range 31 of the node N1, and therefore unable to receive a timing signal sent from the node N1. It follows that the nodes N1 and N5 cannot interact with each other but are apt to send out data signals at the same time, resulting in a collision between the data signals.

Under the above circumstances, it is desirable to control the propagation range of transmitted timing signals and data transmissions in such a manner as to avoid a collision from occurring between data transmissions when the propagation range of a transmission timing signal is short of one two times longer than the propagation range of a data signal.

SUMMARY OF THE INVENTION

It is an object of the present invention to provide a telecommunications system allowing each node to settle its own transmission timing in a distributed coordination fashion without being controlled by a centralized node and making a decision on and avoiding a collision between data transmissions.

A transmission timing control apparatus included in a plurality of nodes constituting a telecommunications system of the present invention includes a transmission timing determining circuit configured to receive a state variable signal, which is transmitted from a neighboring node and affected by a phase representative of the data transmission timing of the neighboring node, and to vary the state of the phase of the own node according to a rule to thereby determine the data transmission timing of the own node or node of interest. A node information transmitter/receiver transmits source identification information particular to the own node and source node information of a data signal received by the own node, and receives node information transmitted from the neighboring node. A neighboring node information collecting circuit collects neighboring node information of neighboring nodes having received data signals on the basis of the source identification information received by the node transmitter/receiver and the source node information. A collision determination circuit compares the number of neighboring nodes to which the transmission timing determining circuit is related as to the control of the data transmission timing with the number of nodes based on the all neighboring node information to determine the probability of a collision between data transmissions.

Also disclosed are a node which constitutes a telecommunications network together with other nodes and includes the transmission timing control apparatus stated above, a telecommunications system including a plurality of nodes which constitutes a telecommunications system and each of which includes the transmission timing control apparatus stated above, and a transmission timing control method applicable to the node.

BRIEF DESCRIPTION OF THE DRAWINGS

The objects and features of the present invention will become more apparent from consideration of the following detailed description taken in conjunction with the accompanying drawings in which:

FIG. 5 is a flowchart useful for understanding a specific impulse signal receipt procedure unique to the illustrative embodiment;

FIGS. 6A and 6B show specific contents of a direct data receipt node table, and FIG. 6C shows specific contents of an indirect data receipt node table, included in the illustrative embodiment;

DESCRIPTION OF THE PREFERRED EMBODIMENTS

A preferred embodiment of the telecommunications system in accordance with the present invention will be described hereinafter. The illustrative embodiment is applied to communication control means included in each of a plurality of nodes spatially distributed in, e.g. an ad hock network or a similar, equally distributed type of telecommunications network. It is to be noted that a node refers to equipment having at least computing and communication functions and may be implemented by a computer, a mobile communication terminal or a PDA (Personal Digital Assistant) by way of example.

Figure 1:
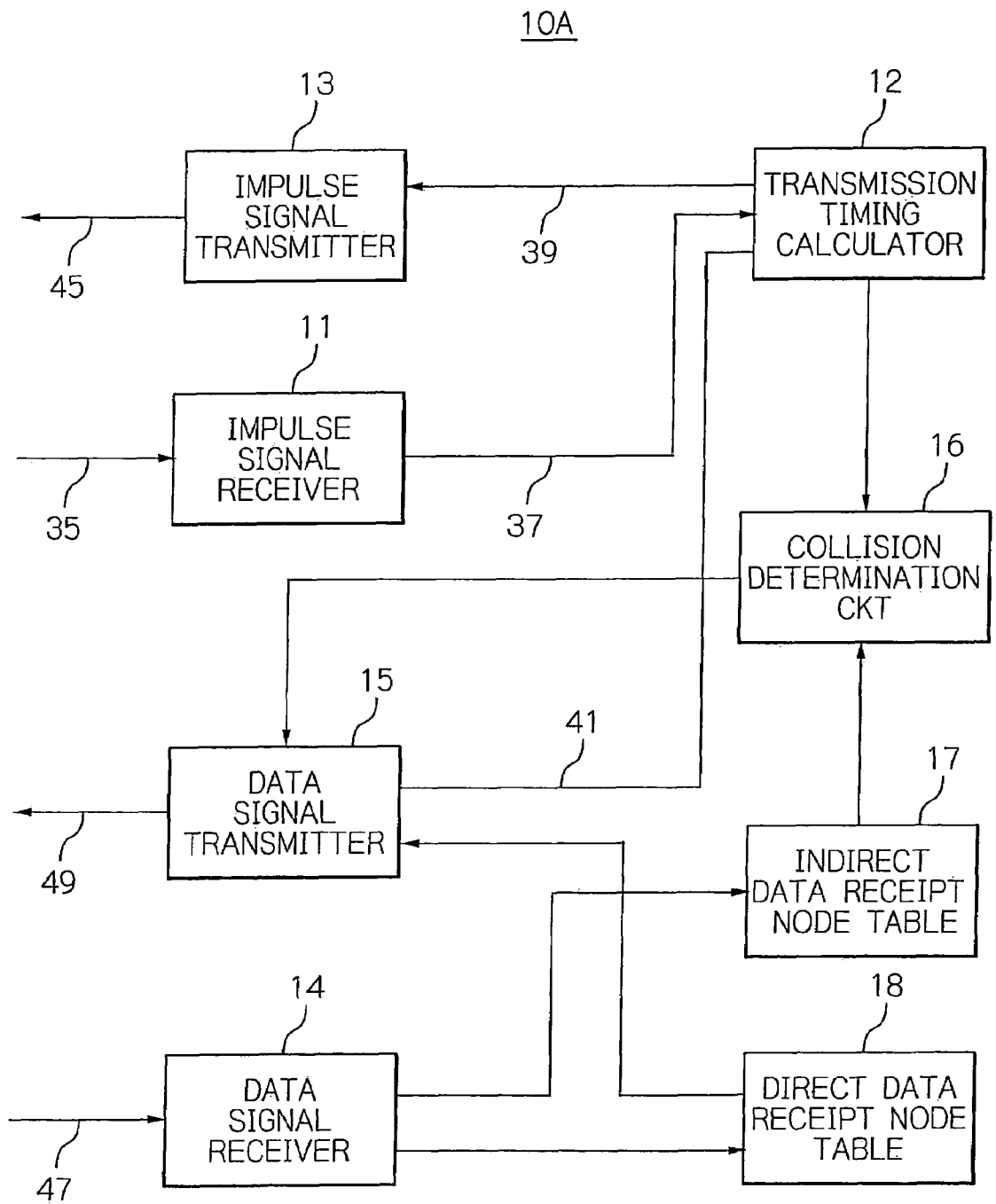
FIG. 1 is a schematic block diagram showing a preferred embodiment of the node, constituting a telecommunications network together with other nodes, in accordance with the present invention.

FIG. 1 is a schematic block diagram showing the configuration of a node embodying the present invention and constituting a telecommunications network together with other nodes having the same configuration. As shown, the node, generally 10A, includes an impulse signal receiver 11, a transmission timing calculator 12, an impulse signal transmitter 13, a data signal receiver 14, a data signal transmitter 15, a collision determination circuit 16, an indirect data receipt node table 17 and a direct data receipt node table 18, which are interconnected as illustrated.

The impulse signal receiver 11 is adapted to receive, as an input signal 35, an output impulse signal transmitted from a neighboring node, not shown, and not conveying destination information. The neighboring node may be another node existing in a range over which an electromagnetic wave emitted from the node 10A can propagate. The impulse signal receiver 11 is adapted to feed the transmission timing calculator 12 with a received impulse signal 37 coming from the input impulse signal 35. It is to be noted that an impulse signal refers to a signal transmitted and received in the form of transmission timing signal and has its impulse waveform having a Gaussian distribution or the like. The impulse signal may be designed to contain, if desired, destination address, e.g. address information representative of the spatial position of a node having sent the output impulse signal. Also, to output the received impulse signal 35, the impulse signal receiver 11 may be adapted to shape the waveform of the input impulse signal 35 or regenerate the input impulse signal itself.

The transmission timing calculator 12 is adapted to receive the received input impulse signal 37 from the impulse signal receiver 11 to generate phase signals 39 and 41 in accordance with the signal 37, the phase signals 39 and 41 defining the transmission timing of the node 10A. The transmission timing calculator 12 is also adapted to count, when calculating a transmission timing, nodes which are interacting with the node 10A on the basis of the received impulse signal 37 and hold its resultant count, as will specifically be described later. The transmission timing calculator 12 is further adapted to feed the impulse signal transmitter 13 and the data signal transmitter 15 with the phase signals 39 and 41 thus generated, respectively. The transmission timing calculator 12 generates and outputs the phase signals 39 and 41 even when the received impulse signal 37 is not input thereto.

Assuming that the phase signal of a node i has a value of $\theta_i(t)$ at a time t, then the transmission timing calculator 12 varies the phase signal $(=\theta_i(t))$ in nonlinear oscillation rhythm in accordance with the received input signal 12, as represented by the following expressions:

$$d\theta_i(t)/dt = \omega + \sum_{k=1}^{N} P_k(t) \cdot R(\theta_i(t), \sigma(t)), \tag{1}$$

$$R(\theta_i(t), \sigma(t)) = \sin(\theta_i(t) + \sigma(t)), \tag{2}$$
$$\sigma(t) = \Pi + \varphi(t),$$

where $\theta_i(t)$ denotes the phase signal of the node i, $\omega$ denotes a specific angular frequency parameter, $P_k(t)$ denotes a received impulse signal 37 received from a neighboring node, $R(\theta_i(t), \sigma(t))$ denotes a phase response function, and $\phi(t)$ denotes a random noise function.

The variation of the phase signal represented by the expression (1) realizes a nonlinear characteristic that causes nearby nodes to tend to become opposite in phase (inversion of an oscillation phase) or become different in phase from each other. The illustrative embodiment uses such a nonlinear characteristic for avoiding collisions, i.e. establishes a suitable time relation or time lag in order to prevent, e.g. the transmission timings of output impulse signals sent from neighboring nodes from colliding with each other.

More specifically, the expression (1) is representative of a rule according to which the node i varies the nonlinear oscillation rhythm of its own phase signal $\theta_i(t)$ in accordance with the received impulse signal 37 fed from the impulse signal receiver 11. In the expression (1), the first member $\omega$ of the right side, denoting a specific angular frequency parameter, is representative of a basic variation rhythm assigned to all nodes constituting the network and corresponding to the basic rate of transition of the own operation state while the second member of the right side is representative of a nonlinear variation.

In the illustrative embodiment, the specific oscillation frequency parameter $\omega$ is the same throughout the system. The function $P_k(t)$ is representative of a signal 37 output from the impulse signal receiver 11 in accordance with an impulse signal 35 received from a neighboring node k, which is a natural number of 1 to N. The function $R(\theta_i(t), \sigma(t))$ is a phase response function expressing a response characteristic that causes the basic rhythm of the node i to vary in accordance with an impulse signal 35 received from another node; this function accords to an expression (2) by way of example. The expression (2) indicates that the phase response function is defined by the sinusoidal wave having its phase equal to a value resultant from superposing random noise on the phase opposite to the phase signal $\theta_i(t)$ at a time t.

This intends to establish a non-linear characteristic of the tendency in which nodes neighboring each other go to the state of opposite phase to each other, i.e. inversion state in oscillation phase, so as to avoid collision. More specifically, in order for the transmission timing of impulse signals not to collide between the neighboring nodes, an appropriate timing relation or time lag is made established between the timings at which the phase signals of those nodes have the same value.

In the expression (2), a constant term $\pi$[rad], expressing the function $\sigma(t)$, implements the nonlinear characteristic that causes nearby nodes to tend to become opposite in phase while the random noise function $\sigma(t)$, which accords to, e.g. a Gaussian distribution with a mean value of zero, provides the nonlinear characteristic with random variability. The random variability copes with an occurrence that the system fails to reach the target stable state or optimum solution and falls in another stable state or local solution.

While the expression (2) is based upon a sinusoidal function as the simplest model of the phase response function $R(\theta_i(t), \sigma(t))$, use may be made of any other suitable function as a phase response function. If desired, the constant term $\pi$ of the function $\sigma(t)$ may be replaced with any other suitable constant $\lambda(0<\lambda<2\pi)$, in which case nearby nodes tend to become different in phase from each other instead of becoming opposite in phase to each other.

The functional principle of the transmission timing calculator 12 will be described more specifically with reference to FIGS. 3A through 3C and 4A through 4C. It is to be noted that the function of the impulse signal transmitter 13 also relates to status transitions shown in FIGS. 3A through 4C. Paying attention to a given node, FIGS. 3A through 4C demonstrate a relation between the given node or node of interest i and a neighboring node j or nodes j1, j2, i.e. how a phase relation between the nonlinear oscillation rhythms of the nodes varies with the elapse of time.

Figure 3A:
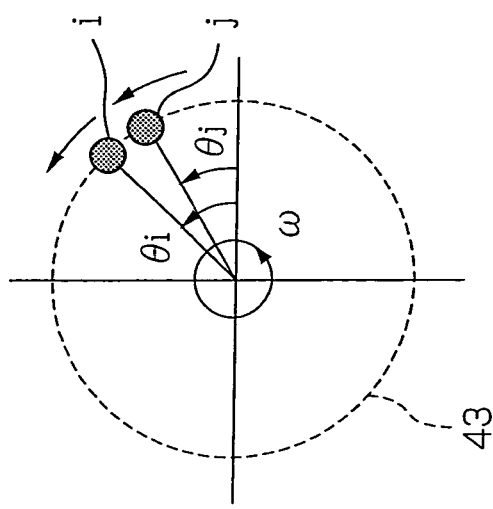
FIGS. 3A, 3B and 3C show a specific case wherein nodes are tuned in the illustrative embodiment.
Figure 3B:
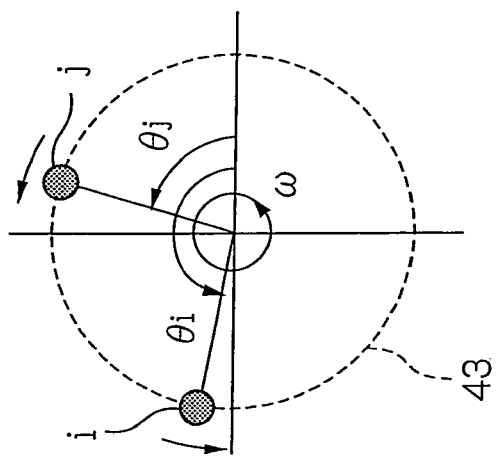
Figure 3C:
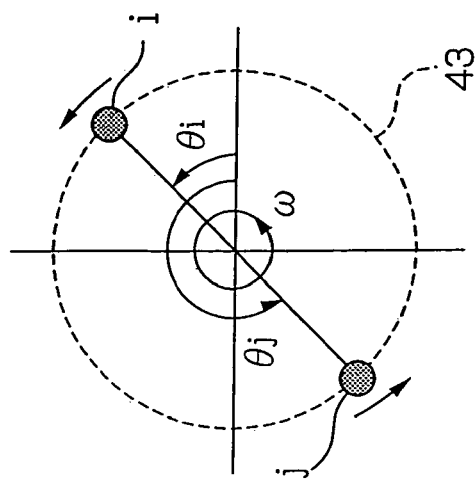

FIGS. 3A, 3B and 3C show a specific case wherein a node of interest or own node i and a single node j adjoining it exist together. In the figures, two material points i and j, rotating on a circle 43, are respectively representative of the nonlinear oscillation rhythm of the node of interest i and that of the neighboring node j. The angles $\theta_i$ and $\theta_j$ of the material points i and j, respectively, on the circle 43 are representative of the instantaneous values of phase signals. The circular movements of the material points i and j are projected onto the ordinate or the abscissa to represent the respective nonlinear oscillation rhythms. The two material points i and j tend to become opposite in phase to each other in accordance with the operation represented by the expression (1), which will be described later specifically. As a result, even if the phases of the two material points i and j are close to each other, as shown in FIG. 3A, initial state, the status varies as the time elapses via a transitional state shown in FIG. 3B to a stable state shown in FIG. 3C in which the phase difference between the two points i and j is substantially equal to pi, $\pi$.

The two material points i and j rotate at the primary angular velocity equal to the respective specific angular oscillation frequency parameter $\omega$. The primary angular velocity corresponds to the basic velocity at which a material point varies its state. When the two nodes i and j become interactive in response to impulse signals transmitted therebetween, the two points i and j vary the angular velocity thereof ahead or behind so as to ultimately establish the stable state at which the appropriate relation is maintained. This operation may be considered to indicate that the two points i and j repel each other while rotating to establish the stable phase relation. In the stable state, FIG. 3C, if each of the two nodes transmits the output impulse signal when it has its phase equal to a predetermined value, e.g. zero, then both nodes are brought into the transmission timing to establish the appropriate timing relation with each other.

Figure 4C:
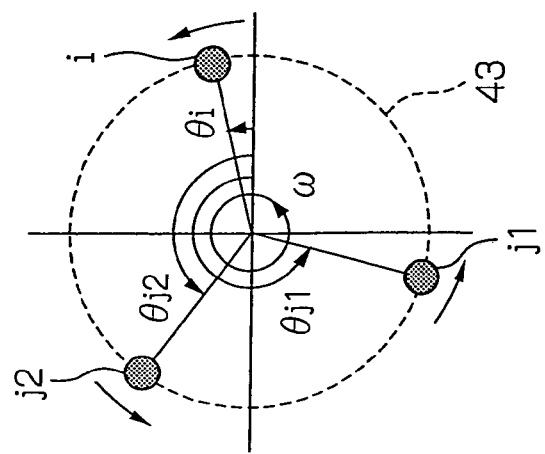
FIGS. 4A, 4B and 4C show another specific case wherein nodes are tuned in the illustrative embodiment.
Figure 4B:
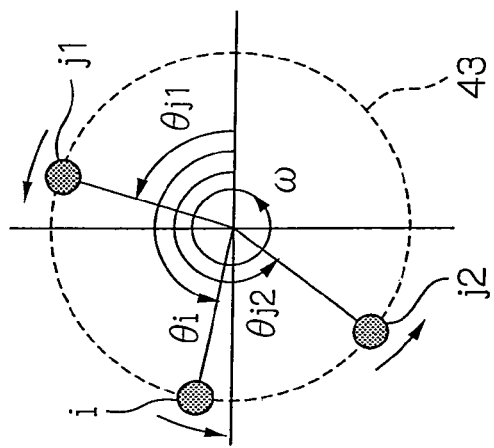
Figure 4A:
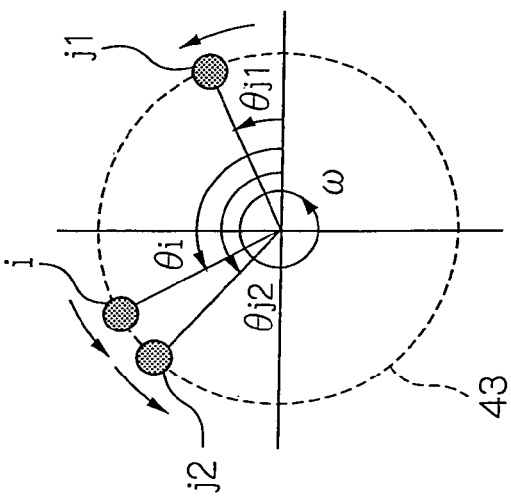

FIGS. 4A, 4B and 4C show another specific case wherein the own node i and two neighboring nodes j1 and j2 exist together. In this case, too, the material points i, j1 and j2 repel each other while in rotation, establishing the stable phase relation with respect to time. This is also true when three or more nodes neighbor the node of interest i.

The stable phase relation or stable state thus established is in nature highly adaptive to a change in the number of neighboring nodes, i.e. highly flexible. For example, assume that when a single nodes j1 neighbors the node of interest i in a stable phase relation or stable state, FIG. 4A, another neighboring node j2 is added. Then, although the stable state is once disturbed, see FIG. 4B, a new stable state, FIG. 4C, is again established with the node of interest i and two neighboring nodes j1 and j2 via the transition state shown in FIG. 4B. This is also true when either one of the neighboring nodes j1 and j2 disappears or fails due to an error or similar cause having occurred therein.

Referring again to FIG. 1, the impulse signal transmitter 13 is adapted to transmit an output impulse signal 45 in accordance with the phase signal 39 fed from the transmission timing calculator 12, i.e. when the phase signal 39 reaches a preselected phase $\alpha$ ($0 \leq \alpha < 2\pi$). The preselected phase $\alpha$ should preferably be uniform in the entire telecommunications system and will be assumed to be zero hereinafter, for example. In the state shown in FIG. 3C, because the phase signals of the nodes i and j differ in phase from each other by $\pi$ in the stable state, the transmission timings of output impulse signals 45 from the node i and j are shifted from each other by $\pi$ despite that $\alpha$ is uniform in the entire system.

The data signal receiver 14 is adapted to receive user data or a control signal sent from another node as an input data signal 47 and produce a direct data receipt node table 18 on the basis of a source node number included in the input data signal 47. Further, the data signal receiver 14 is adapted to receive from the neighboring node having sent the input data signal 47 a direct data receipt node table corresponding to the table 18 to produce an indirect data receipt node table 17 in accordance with a node number assigned to the neighboring node or source node and the direct data receipt node table 18 received.

The direct data receipt node table 18 lists node numbers assigned to the neighboring nodes from which the node 10A can directly receive input data signals. On the other hand, the indirect data receipt node table 17 lists both of the node number of the neighboring node from which the node 10A can directly receive an input data signal 47 and the node number of a node from which the above neighboring node received an input data signal corresponding to the signal 47.

While in the illustrative embodiment a node number may be a particular number fixedly assigned to each node beforehand, e.g. a MAC (Media Access Control) address, any other identification information capable of distinguishing nodes may be used.

The data signal transmitter 15 is adapted for transmitting a data signal 49 which is originated in the node or source node 10A or relayed by the node 10A. More specifically, the data signal transmitter 15 is adapted to transmit, when reported from the transmission timing calculator 12 of the stable state, a data signal 49 in a time slot as will be described specifically later. In this context, the words "time slot" are not directed to a fixed time interval conventionally allotted to a node by, e.g. a system, but are used.

Further, the data signal transmitter 15 is adapted for sending out not only the data signal but also the direct data receipt node table 18 originated in the node 10A to the network. It should be noted that the data signal transmitter 15 sends out a control signal at the timing at which the data signal 49 is expected to be sent out from the node 10A and not actually sent out, or with the control signal added to the data signal.

In the illustrative embodiment, a time slot mentioned above refers to an interval in which the phase signal $\theta_i(t)$ lies in the range of $\delta 1 \leq \theta_i(t) \leq \delta 1 - \delta 2$. The time slot begins when the transmission of an impulse signal ends and ends at a time preceding the timing of an impulse signal received first in every period of the phase signal by some offset, $\delta 2$. The value of the phase signal is assumed to be $\delta 1$ at the beginning of the slot and $\beta 1-\delta 2$ at the end of the time slot. The value of $\delta 1$ and $\delta 2$ is equal to a phase width corresponding to an extremely short period of time that compensates for the absence of both of an impulse signal and a data signal, regardless of being transmitted from the own node or another node, in the radio space formed by the node of interest.

For example, in the stable state shown in FIG. 3C, the node i starts transmitting an impulse signal 45 when the phase $\theta_i$ is zero, ends the transmission of the impulse signal 45 before the phase $\theta_i$ reaches $\delta 1$, starts sending out a data signal 49 when the phase $\theta_i$ is $\beta 1$, ends the transmission of the data signal 49 when the phase $\theta_i$ reaches $\beta 1-\delta 2$ where $\beta 1$ is nearly equal to $\pi$, and then stops transmitting the impulse signal 45 and the data signal 49 until the phase $\theta_i$ again becomes zero. Although the other node j operates in the same manner as the node i on the basis of a phase $\theta_j$, the transmitting operations of the two nodes i and j do not coincide with each other because the phases $\theta_i$ and $\theta_j$ are shifted from each other by about $\pi$. This is also true with a case wherein the number of nodes is three or more.

As stated above, the specific angular frequency parameter $\omega$ is uniform in the entire telecommunications system or network and allows the stable state to be established more easily than when it irregularly differs from one node to another. Should the specific angular frequency $\omega$ be not uniform in the telecommunications system, the number of nodes transmitting abnormal impulse signals would increase and therefore obstruct the transition to the stable state.

The data signal transmitter 15 sends out a control signal at the timing at which a data signal 49 is expected to be sent out from the node 10A and not actually sent out, or with the control signal added to the data signal, as stated previously.

Well, the collision determination circuit 16 is adapted for comparing the number of interactive nodes held by the transmission timing calculator 12 with the number of nodes listed in the indirect data receipt node table 17 to determine, based on the result of comparison, whether or not data signals 47 transmitted from neighboring nodes are liable to collide with each other. The collision determination circuit 16 is also adapted to subsequently control the ability of transmitting or receiving an impulse signal and/or a data signal in accordance with the result of the above decision.

More specifically, the collision determination circuit 16 determines that data signals are liable to collide when the number of nodes listed in the indirect data receipt node table 17 is greater than the number of interactive nodes, or determines that data signals are not liable to collide when the former is equal to or smaller than the latter.

Why the collision determination circuit 16 controls the ability of transmission and reception in accordance with the result of decision is that, when data signals are liable to collide, there should be avoided a collision between data signals sent from non-interactive ones of the nodes listed in the indirect data receipt node table 17 and a data signal sent from the own node. Another advantage achievable with controlling the ability of transmission and reception even when the probability of a collision is zero is that there can be reduced loads on the transmission and receipt of the own node.

More specifically, in a situation where data signals are liable to collide, if the collision determination circuit 16 raises, e.g. the sensitivity of receiving an impulse signal, then it can receive impulse signals even transmitted from non-interactive one of the nodes listed in the indirect data receipt node table 18. This allows a transmission timing to be generated based on new interaction including that node. Of course, the collision determination circuit 16 may be designed to control not only the sensitivity of receiving an impulse signal but also the transmission output strength of an impulse signal, the sensitivity of receiving a data signal and/or the transmission output strength of a data signal, alone or in combination.

Figure 2:
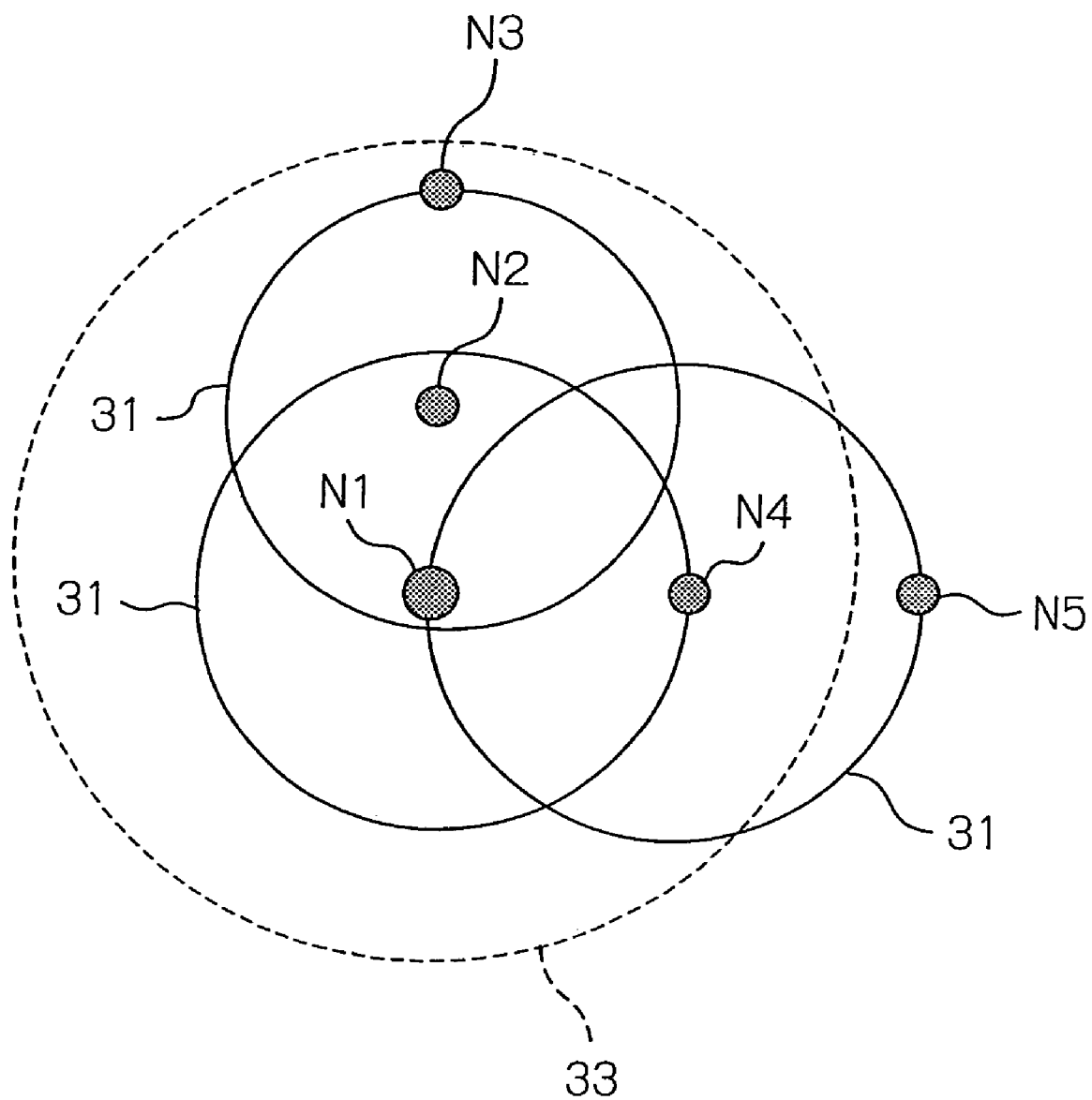
FIG. 2 shows a specific positional relation between nodes in a telecommunications system.

A specific operation of the nodes included in the telecommunications network of the illustrative embodiment will be described hereinafter by assuming the positional relation between the nodes shown in FIG. 2 by way of example. In FIG. 2, the solid circles 31 indicate the propagation ranges of data signals 49 while the dotted circle 33 indicates the propagation range of impulse signals 45. In the condition shown in FIG. 2, the node N1 is capable of transmitting and receiving data to and from the nodes N2 and N3 lying in the solid circles 31, and transmitting and receiving data to and from the nodes N2, N3 and N4 lying in the dotted circle 33 for controlling the data transmission timing. The node N4 is capable of receiving data signals 49 from the nodes N1 and N5 lying in the solid circles 31. How each node determines the probability of a collision between data signals in the telecommunications system shown in FIG. 2 will be described specifically hereinafter.

First, reference will be made to FIG. 5 for describing how the node 10A, FIG. 1, operates when received an impulse signal 35. At this instant, the node 10A collects neighboring node information for use in determining the probability of a collision between data signals 47.

As shown in FIG. 5, when an impulse signal 35 emitted from a neighboring node present in the communications system arrives, it is input to the impulse signal receiver 11, step S1. The impulse signal receiver 11 delivers the received impulse signal 37 to the transmission timing calculator 12. In response, the transmission timing calculator 12 recalculates a transmission timing in accordance with the received impulse signal 37.

After the receipt of the impulse signal by the impulse signal receiver 11, a data signal or a control signal sent from the neighboring node within the transmission time of the node arrives at the node 10A. Such a data signal or a control signal is received by the data signal receiver 14, step S2. If the receipt of the data signal or the control signal from the neighboring node is not confirmed within the transmission time of the node (NO, step S2), then the node 10A determines that it does not lie in the data signal propagation range of the neighboring node and then ends the procedure of FIG. 5.

In the illustrative embodiment, a data signal or a control signal sent from a neighboring node will be referred to as a data propagation node signal for a distinction purpose. The data propagation node signal includes at least a source node number and a receipt node number list which, in turn, includes the direct data receipt node table 17.

Upon receiving a data propagation node signal (YES, step S2), the data signal receiver 14 confirms a source node number included in the received signal 47 and then enters it in the direct data receipt node table 18, step S3.

FIGS. 6A and 6B respectively show specific nodes listed in the direct data receipt node tables 18 of the nodes 2 and 4, FIG. 2. As shown in FIG. 6A, when the node N2 receives data propagation node signals from, e.g. the nodes 1 and 3 present in the solid circle 31, the node N2 enters the identification of the nodes 1 and 3 in its direct data receipt node table 18. Likewise, as shown in FIG. 6B, when the node N4 receives data propagation node signals from the nodes 1 and 5 present in the solid circle 31, the node N4 enters the identification of the nodes 1 and 5 in its direct data receipt node table 18.

The data signal receiver 14 produces the indirect data receipt node table 17 on the basis of the receipt node number list included in the data propagation node signal, step S4. If the node number read out from the receipt node number list for the current reception is already present in the indirect data receipt node list 17, however, it need not be over-written into the indirect node data table 17. Because a node number once entered in the indirect data receipt node table 17 is not deleted from the table 17 until the interaction is brought out of the stable state. Subsequently to the deletion, whenever the stable state is restored, the table 17 is reconstructed. Thus, the identification of the node from which no data signal has received any more will not be maintained in the indirect data receipt node table 17. Further, if the node number of the own node 10A is not included in the receipt node number list of the data propagation node signal, the data signal receiver 14 does not update the indirect data receipt node table 17 because the absence of the own node number means that a data signal is not received.

For example, on receiving the direct data receipt node tables 17 shown in FIGS. 6A and 6B from the nodes 1 and 4, respectively, the node N1 produces the indirect data receipt node table 17 shown in FIG. 6C.

As stated above, the node 10A collects, when having received an impulse signal 35, information from neighboring nodes in order to determine the probability of collision between data signals 49.

Figure 7:
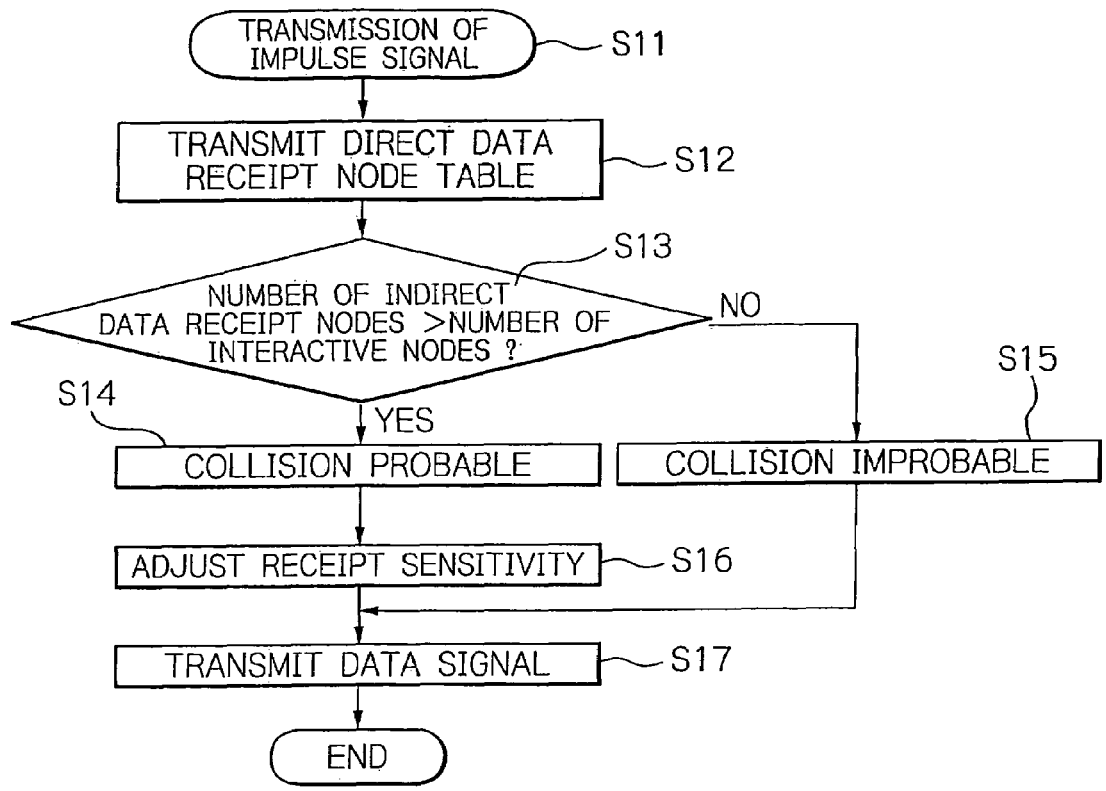
FIG. 7 is a flowchart useful for understanding an impulse signal transmission procedure also unique to the illustrative embodiment.
Figure 8:
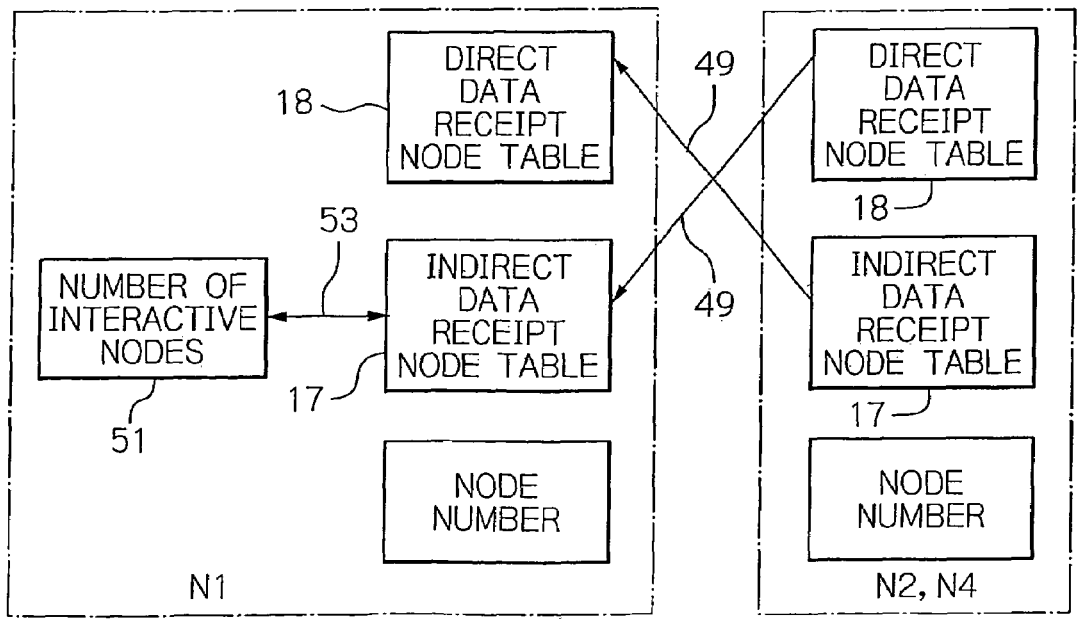
FIG. 8 is a schematic block diagram useful for understanding the operation of the illustrative embodiment.

FIG. 7 shows a specific procedure to be executed by the node 10A when transmitting a timing signal. FIG. 8 demonstrates the operation of the illustrative embodiment. Briefly, the node 10A determines, when transmitting a timing signal, the probability of collision between data signals and transmits data signal receipt information to another node.

First, the transmission timing calculator 12 calculates a transmission timing, and at the timing thus calculated the transmission timing calculator 12 reports the maturity of the transmission timing to the impulse signal transmitter 13. In response, the impulse signal transmitter 13 emits an impulse signal 45 to the network, step S11. Subsequently, the data signal transmitter 15 transmits a data signal 49 containing the direct data receipt node table 18 stored in the node 10A to the network, step S12.

After the transmission of the data signal 49 containing the direct data receipt node table 18, the collision determination circuit 16 of e.g. node N1, FIG. 8, compares the number of interactive nodes 51 stored in the transmission timing calculator 12 with the number of nodes listed in the indirect data receipt node table 17, see step S13, FIG. 7, and an arrow 53, FIG. 8. If the number of node listed in the indirect data receipt node table 17 is greater than the number of interactive nodes 51 (YES, step S13), then the collision determination circuit 16 determines that a collision between data signals is probable, step S14. Otherwise (NO, step S13), the determination circuit 16 determines that a collision is not probable, step S15.

For example, assume that the node N1 produced the indirect data receipt node table 17 shown in FIG. 6C on the receipt of an impulse signal 35; four nodes are listed in the table 17. At this instant, the nodes N2, N3 and N4 are interacting with the node N1, so that the number of interactive nodes is three. In this case, the collision determination circuit 16 of the node N1 determines that a collision is probable by comparing (53) the number of nodes, which is four, listed in the indirect data receipt node table 17 with the number of interactive nodes, which is three.

More specifically, in the above specific case, the collision determination circuit 16 determines that a data signal sent from the node N1 and a data signal sent from the node N5 are liable to collide at a node not interacting with the node N1, but capable of receiving signals from a node listed in the indirect data receipt node table 17, i.e. the node N4.

Upon determining that data signals a reliable to collide, step S14, the collision determination circuit 16 controls the ability of transmitting or receiving an impulse signal and/or a data signal in accordance with the result of decision. In the illustrative embodiment, the collision determination circuit 16 so controls the impulse signal receiver 11 as to raise the receipt sensitivity of an impulse signal for the following reason, step S16.

When the receipt sensitivity of an impulse signal is raised, as mentioned above, the node N1 becomes capable of receiving an impulse signal from the node N5. As a result, the number of interactive nodes stored in the node N1 varies to become equal to the number of nodes listed in the indirect data receipt node table 17. Also, in response to such a change in the number of interactive nodes, the transmission timing calculator 12 recalculates a transmission timing in order to avoid a collision. Stated in another way, because the nodes N1 and N5 interact with each other, the probability is canceled that the node N4 will receive data signals from both of the nodes N1 and N5 at the same time.

While in the illustrative embodiment the collision determination circuit 16 so controls the impulse signal transmitter 11 as to raise the receipt sensitivity of an impulse signal when data signals are liable to collide, such control is only illustrative. Alternatively, the collision determination circuit 16 may be adapted to cause the data signal transmitter 15 to lower the receipt sensitivity when a collision is not liable to occur. Further, the collision determination circuit 16 may be adapted for controlling the receipt sensitivity of a data signal or controlling the transmission output of an impulse signal and/or a data signal. It is to be noted that if the collision determination circuit 16 uses a collision avoiding method different from the method described above, then the flowchart shown in FIG. 7 will be modified accordingly.

After the transmission or receipt ability has been adjusted by the collision determination circuit 16, step S16, data to be transmitted will be sent out by the data signal transmitter 15 in the form of data signal 49 representative of the above data until receiving the following impulse signal 35, i.e. within a time slot assigned to the own node, step S17.

As stated above, in accordance with the illustrative embodiment, each node sends out a direct data receipt node table together with a data signal, produces an indirect data receipt node table, and then compares the number of nodes listed in the indirect data receipt node table with the number of interactive nodes to thereby find out a node whose timing should be controlled and the fact that timing control is not actually executed. Each node can therefore determine the probability of collision between data signals.

An alternative embodiment of the telecommunications system in accordance with the present invention will be described hereinafter. While the node 10A of the previous embodiment produces the direct data receipt node table 18 and indirect data receipt node table 17 on the basis of a source node number contained in a received data signal 47, the illustrative embodiment to be described hereinafter is adapted to generate an interaction subject node table in accordance with a received impulse signal 35 and additionally use the interaction subject node table to determine the probability of a collision.

Figure 9:
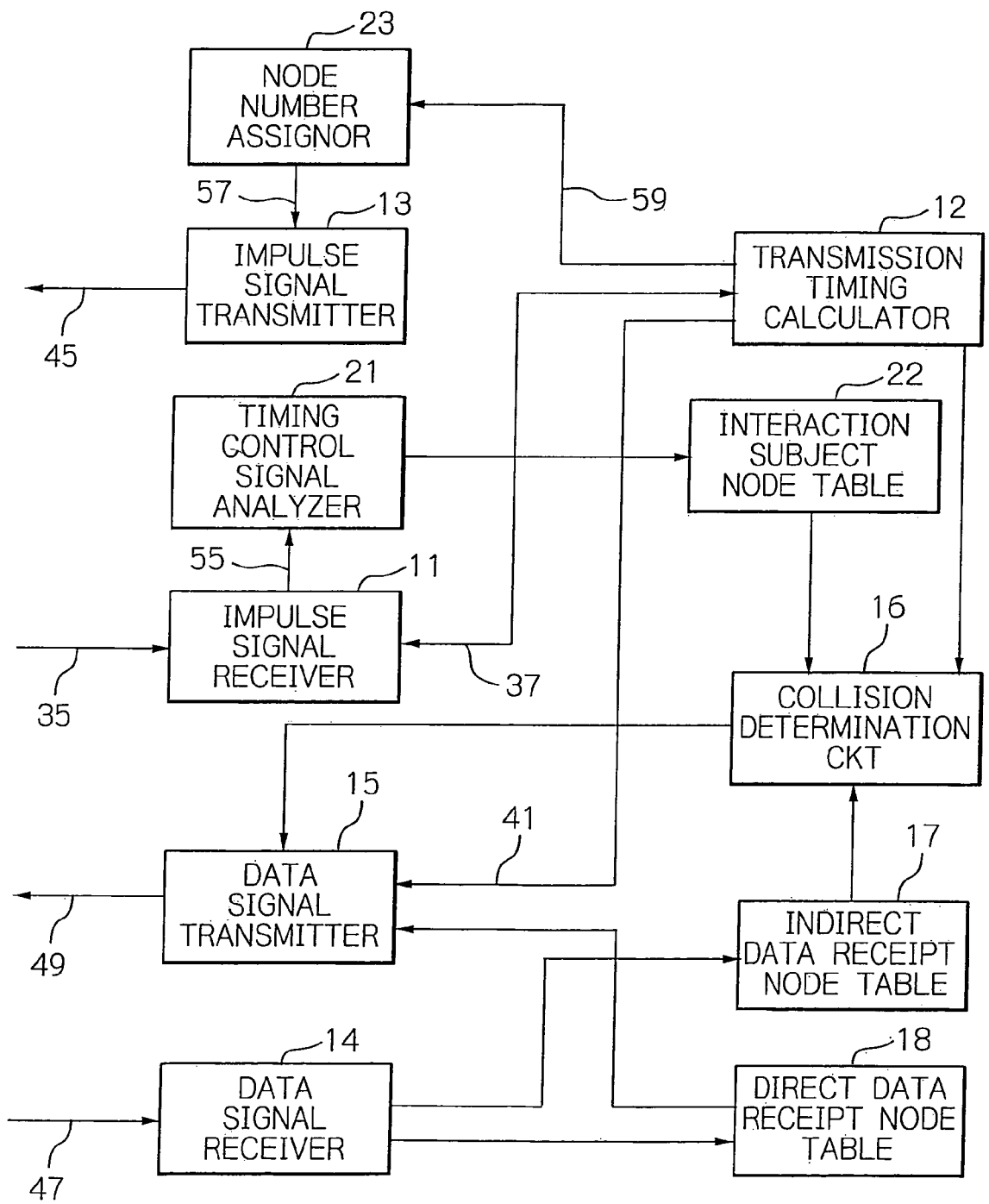
FIG. 9 is a schematic block diagram showing an alternative embodiment of the node in accordance with the present invention.

Referring now to FIG. 9, the illustrative embodiment includes a node 10B constituting a network together with other nodes not shown. As shown, the node 10B includes a timing control signal analyzer 21, an interaction subject node table 22 and a node number assignor 23 in addition to the impulse signal receiver 11, transmission timing calculator 12, impulse signal transmitter 13, data signal receiver 14, data signal transmitter 15, collision determination circuit 16, indirect data receipt node table 17 and direct data receipt node table 18, which are interconnected as illustrated. The structural elements of the illustrative embodiment like those of the previous embodiment are designated with the same reference numerals and will not specifically be described in order to avoid redundancy.

On receiving an input impulse signal 35, the impulse signal receiver 11 delivers the input impulse signal 55 to the timing control signal analyzer 21. The timing control signal analyzer 21 is adapted to be responsive to the input impulse signal 55 to detect source address information out of the input impulse signal 55 and produce the interaction subject node table 22 on the basis of the source address information thus detected.

In the illustrative embodiment, an impulse signal includes address information unique to a source node at the time of transmission. The address information may be any kind of identification information capable of distinguishing the node 10B from other nodes present in the network.

The interaction subject node table 22 lists the node numbers of neighboring nodes from which the node 10B can receive impulse signals. Stated in another way, the table 22 is capable of showing nodes with which the node 10B is interactive.

The node number assignor 23 stores a node number unique to the node 10B beforehand, and is adapted to add, at the time of transmission of an impulse signal 45, the node number stored to the impulse signal 45. The impulse signal with the node number 57 is input to the impulse signal transmitter 13.

The operation of the collision determination circuit 16 unique to the illustrative embodiment will be described hereinafter. In the illustrative embodiment, to determine the probability of collision between data signals, the collision determination circuit 16 compares the number of nodes listed in the interaction subject node table 22 with the number of nodes listed in the indirect data receipt node table 17. More specifically, if the number of nodes listed in the table 17 is greater than the number of nodes listed in the table 22, the collision determination circuit 16 determines that data signals are liable to collide.

The collision determination circuit 16 controls the ability of transmitting or receiving an impulse signal and/or a data signal in exactly the same manner as in the previous embodiment shown in and described with reference to FIG. 1.

A specific operation of the node 10B will be described hereinafter, again taking the positional relation of nodes shown in FIG. 2 as an example.

Figure 10:
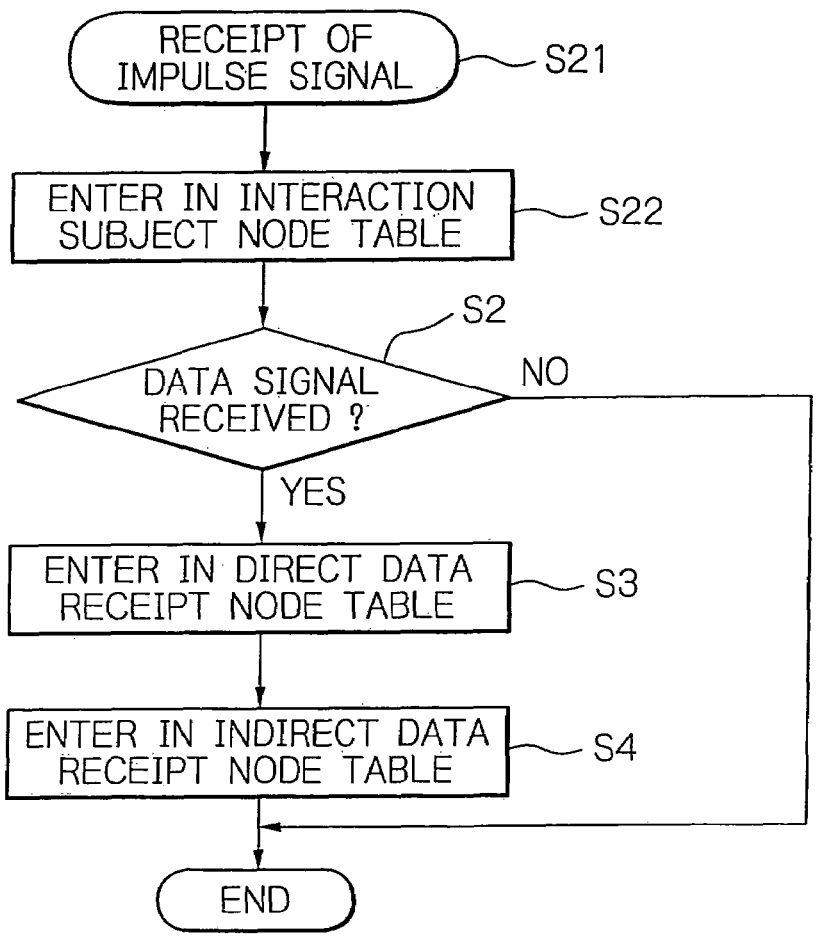
FIG. 10 is a flowchart, like FIG. 5, useful for understanding a specific impulse signal receipt procedure available with the alternative embodiment.
Figure 13:
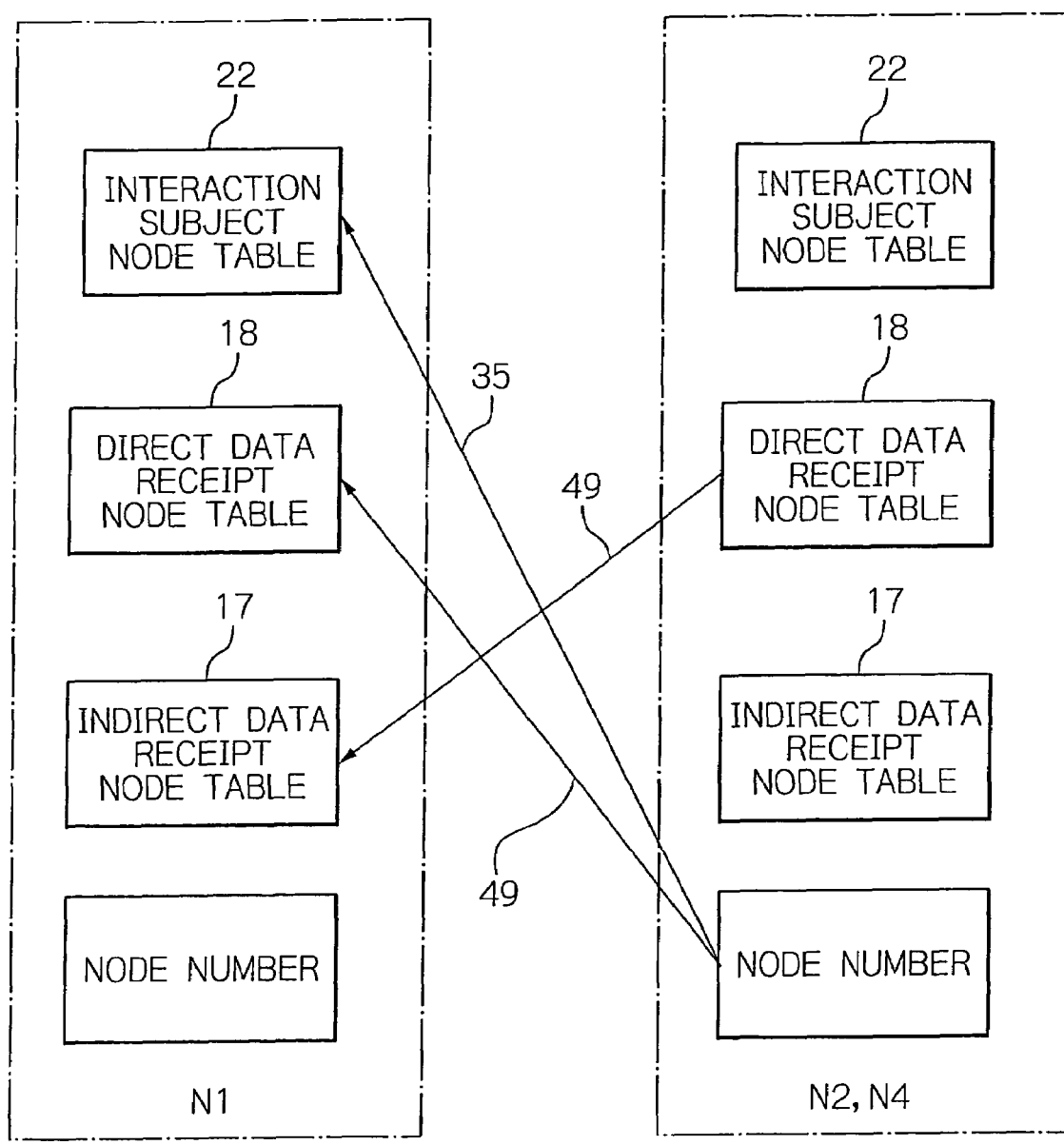
FIG. 13 is a schematic block diagram, similar to FIG. 8, useful for understanding the operation of the alternative embodiment.

FIG. 10 is a flowchart demonstrating a procedure to be executed by the node 10B on the receipt of an impulse signal while FIG. 13 is a schematic block diagram for use in describing the operation of the illustrative embodiment. In FIG. 10, the steps S2, S3 and S4 are depicted again for convenience which are identical with those shown in FIG. 5.

When an impulse signal 49 arrives at the node 10B from the network, the impulse signal receiver 11 receives the impulse signal 49 and then feeds it to the transmission timing calculator 12. The impulse signal receiver 11 delivers the input impulse signal 55 to the timing control signal analyzer 21 also, step S21.

Figure 11:
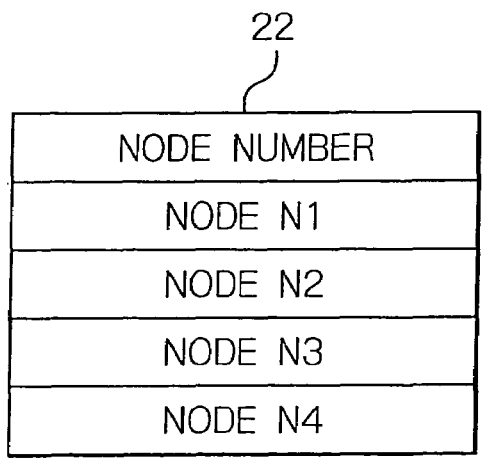
FIG. 11 shows specific contents of an interaction subject node table included in the alternative embodiment.

The timing control signal analyzer 21, having received the input impulse signal 55, detects source address information out of the impulse signal 55 and produces the interaction subject node table 22 on the basis of the source address information, step S22. FIG. 11 shows a specific interaction subject node table 22 generated by the node N1, FIG. 2, by way of example. As shown, the interaction subject node table 22 lists the node numbers of the nodes N2, N3 and N4 as well as the node number of the node N1 because the node N1 is interacting with the nodes N2, N3 and N4 lying in the dotted circle.

When a data signal or a control signal transmitted from a neighboring node arrives at the node 10B within a transmission time available with the neighboring node after the impulse signal 35 received by the impulse signal receiver 11, the data signal or the control signal is received by the data signal receiver 14, step S2. The data signal receiver 14 then generates the interaction subject node table 22, direct data receipt node table 18 and indirect data receipt node table 17, steps S2, S3 and S4. The steps S2, S3 and S4 will not be described specifically because they are described with reference to the previous embodiment.

By the sequence of steps described above, the node 10B produces, when having received an impulse signal 35, the interaction subject node table 22, direct data receipt node table 18 and indirect data receipt node table 17 to thereby collect node information for use in determining the probability of collision between data signals.

Figure 12:
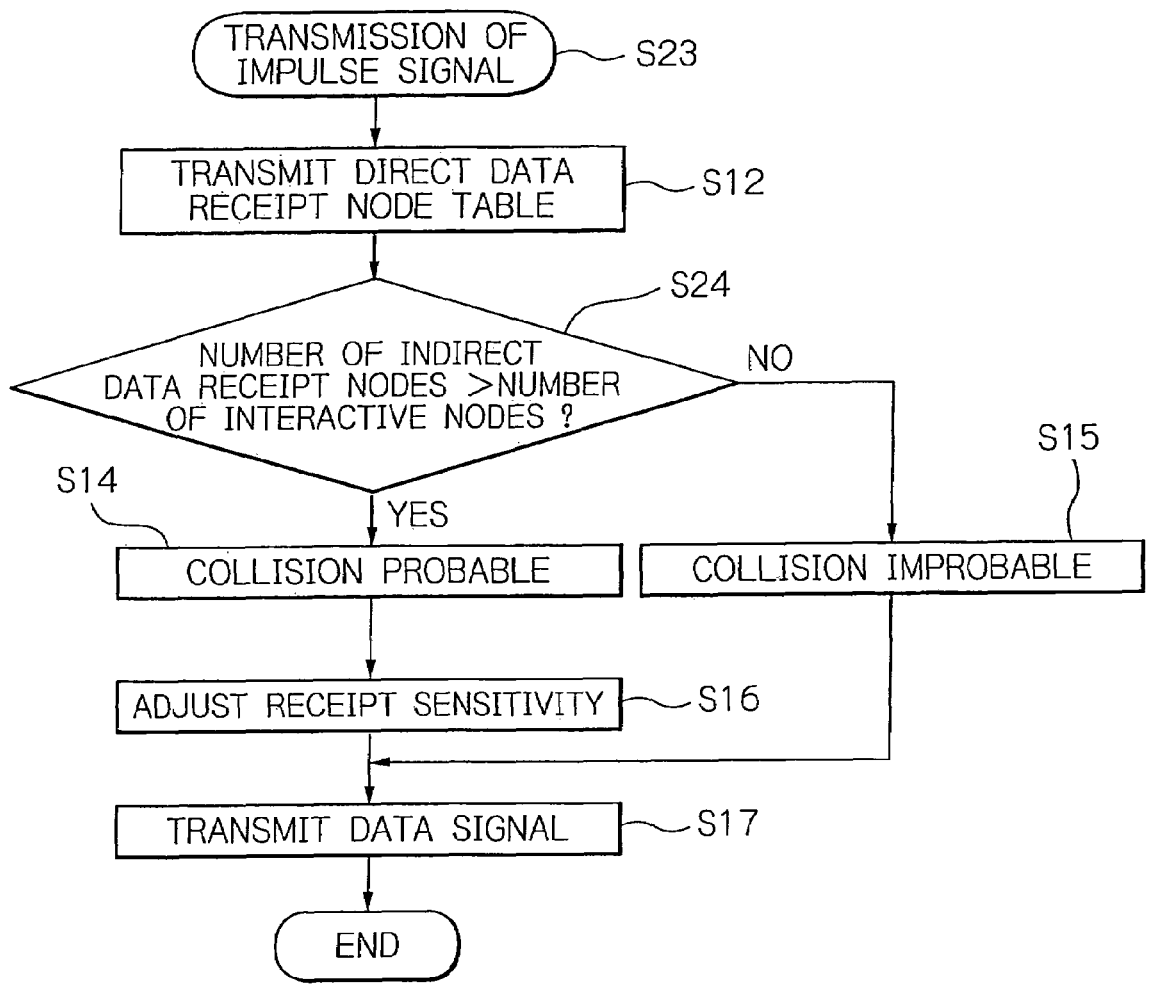
FIG. 12 is a flowchart useful for understanding a specific impulse signal transmission procedure also available with the alternative embodiment.

FIG. 12 demonstrates how the node 10B transmits an impulse signal 45. In FIG. 12, the steps S14 through S17 are depicted again for convenience which are identical with those shown in FIG. 7. Because the procedure shown in FIG. 12 is thus generally similar to the procedure shown in FIG. 7, the following description will concentrate on the steps unique to the alternative embodiment.

When a transmission timing calculated by the transmission timing calculator 12 matures, the transmission timing calculator 12 reports the maturity to the node number assignor 23, as depicted with a connection 59, FIG. 9. In response, the node number assignor 23 adds the node number of the node 10B to the impulse signal 57 to be sent. Subsequently, the impulse signal transmitter 13 transmits the impulse signal 45 with the node number to the network, step S23. This is followed by the transmission of a data signal 49, which contains the direct data receipt node table 18 of the node 10B, from the data signal transmitter 15 to the network, step S12.

After the transmission of the data signal 49 containing the direct data receipt node table 18, the collision determination circuit 16 of, e.g. node N1, compares the number of nodes listed in the interaction subject node table 22 with the number of nodes listed in the indirect data receipt node table 17, step S24. If the number of nodes listed in the table 17 is greater than the number of nodes listed in the table 22, then the collision determination circuit 16 determines that data signals 49 are liable to collide, step S14. Otherwise, the determination circuit 16 determines that a collision is not liable to occur, step S15.

If a collision is liable to occur, the collision determination circuit 16 controls the ability of transmitting or receiving an impulse signal and/or a data signal in the same manner as in the previous embodiment, step S16. Subsequently, the data signal transmitter 15 transmits a data signal 49, step S17.

With the configuration described above, the alternative embodiment achieves the same advantages as the illustrative embodiment shown in and described with reference to FIG. 1. Another advantage attainable with the alternative embodiment is that the comparison of node numbers contained in an impulse signal allows nodes to be accurately referenced even when the number of receptions of data increases or decreases due to, e.g. a reception error.

The collision determination circuit 16 compares, in the embodiment described first, the number of interactive nodes stored in the transmission timing calculator 12 with the number of nodes based on the indirect data receipt node table 17. The collision determination circuit 16 in the alternative embodiment compares the number of interaction subject nodes with the number of nodes based on the indirect data receipt node table 17. Alternatively, the collision determination circuit may be adapted to execute both of such determinations to determine, if one or both of the results of the two determinations show that the number of nodes based on the indirect data receipt node table 17 is greater, that a collision is liable to occur.

The impulse signal receiver 11 and data signal receiver 14, shown and described as being separate from each other in the illustrative embodiments, may be constructed into a single, integrated unit. This is also true with the impulse signal transmitter 12 and data signal transmitter 15.

In the illustrative embodiments shown and described, the node sends its own direct data receipt node table together with a source node number. The system may, however, be designed such that each node manages the source node of a data signal not with a node immediately preceding to the node but a node further preceding the immediately preceding one. This successfully broadens a range over which each node can decide the probability of a collision.

In the illustrative embodiments, the transmission timing calculator 12 may calculate a transmission timing with a method other than the method shown and described so long as it can determine a transmission timing on the basis of an impulse signal in a distributed coordination fashion.

It should be noted that the present invention is applicable not only to wireless communication channels but also to wired communication channels.

In summary, in accordance with the present invention, each node included in a network is capable of flexibly executing effective communication without resorting to a centralized node which would otherwise indicate a particular transmission timing to each node. In addition, each node is capable of determining the probability of a collision between data signals at another node on the basis of node information collected from neighboring nodes and then controlling transmission and reception in accordance with the result of the decision.

The entire disclosure of Japanese patent application No. 2004-377626 filed on Dec. 27, 2004, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A transmission timing control apparatus included in a plurality of nodes constituting a telecommunications system, comprising:

a transmission timing determining circuit for receiving a state variable signal transmitted from neighboring one of the plurality of nodes to one of the plurality of nodes which is of interest, the state variable signal being affected by a phase representative of a data transmission timing of the neighboring node, said transmission timing determining circuit varying a state of a phase of the node of interest according to a rule to thereby determine a data transmission timing of the node of interest, the rule changing a rhythm of a nonlinear oscillation of the phase of the node of interest in response to an impulse signal received from the neighboring node;

a node information transmitter/receiver for transmitting source identification information particular to the node of interest and source node information of a data signal received by the node of interest, and for receiving node information transmitted from the neighboring node;

a neighboring node information collecting circuit operative in response to the source identification information and the source node information for collecting neighboring node information of the neighboring node having received the data signal; and a collision determination circuit for comparing a number of the neighboring nodes to which said transmission timing determining circuit is related as to control of the data transmission timing with a number of nodes based on the neighboring node information, and for determining a probability of a collision between data transmissions, wherein said collision determination circuit determines that data transmissions are liable to collide when the number of nodes based on the neighboring node information is greater than the number of neighboring nodes related to the control of the data transmission timing.

2. The apparatus in accordance with claim 1, further comprising a transmission/receipt control circuit for controlling an ability of at least one of transmitting and receiving the state variable signal when said collision determination circuit determines that data transmissions are liable to collide.

3. The apparatus in accordance with claim 1, further comprising a transmission/receipt control circuit for controlling an ability of at least one of transmitting and receiving the data signal when said collision determination circuit determines that data transmissions are liable to collide.

4. A transmission timing control apparatus included in a plurality of nodes constituting a telecommunications system, comprising:

a transmission timing determining circuit for receiving a state variable signal transmitted from neighboring one of the plurality of nodes to one of the plurality of nodes which is of interest, the state variable signal being affected by a phase representative of a data transmission timing of the neighboring node, said transmission timing determining circuit varying a state of a phase of the node of interest according to a rule to thereby determine a data transmission timing of the node of interest, the rule changing a rhythm of a nonlinear oscillation of the phase of the node of interest in response to an impulse signal received from the neighboring node;

a node information transmitter/receiver for transmitting source identification information particular to the node of interest and source node information of a data signal received by the node of interest, and for receiving node information transmitted from the neighboring node;

a neighboring node information collecting circuit operative in response to the source identification information and the source node information for collecting neighboring node information of the neighboring node having received the data signal; and a collision determination circuit for comparing a number of the neighboring nodes to which said transmission timing determining circuit is related as to control of the data transmission timing with a number of nodes based on the neighboring node information, and for determining a probability of a collision between data transmissions, said transmission timing determining circuit comprising:

a state variable signal receiver for receiving the state variable signal transmitted from the neighboring node;

a state variable signal transmitter for transmitting the state variable signal to which the source identification information of the node of interest is added; and an interaction subject node information generator operative in response to identification information of the neighboring node contained in the state variable signal received by said state variable signal receiver for generating interaction subject node information of an interaction subject node interactive in the phase of the node of interest;

said collision determination circuit comparing a number of nodes based on the interaction subject node information with a number of nodes based on the neighboring node information to determine the probability of a collision between data transmissions, wherein said collision determination circuit determines that data transmissions are liable to collide when the number of nodes based on the neighboring node information is greater than the number of nodes based on the interaction subject node information.

5. The apparatus in accordance with claim 4, further comprising a transmission/receipt control circuit for controlling an ability of at least one of transmitting and receiving the state variable signal when said collision determination circuit determines that data transmissions are liable to collide.

6. The apparatus in accordance with claim 4, further comprising a transmission/receipt control circuit for controlling an ability of at least one of transmitting and receiving the data signal when said collision determination circuit determines that data transmissions are liable to collide.

7. A communication node constituting a telecommunications network together with another node and including a transmission timing control apparatus, said transmission timing control apparatus comprising:

a transmission timing determining circuit for receiving a state variable signal transmitted from a neighboring node to said communication node, the state variable signal being affected by a phase representative of a data transmission timing of the neighboring node, said transmission timing determining circuit varying a state of a phase of said communication node according to a rule to thereby determine a data transmission timing of said communication node, the rule changing a rhythm of a nonlinear oscillation of the phase of the communication node in response to an impulse signal received from the neighboring node;

a node information transmitter/receiver for transmitting source identification information particular to said communication node and source node information of a data signal received by said communication node, and for receiving node information transmitted from the neighboring node;

a neighboring node information collecting circuit operative in response to the source identification information and the source node information for collecting neighboring node information of the neighboring node having received the data signal; and a collision determination circuit for comparing a number of the neighboring nodes to which said transmission timing determining circuit is related as to control of the data transmission timing with a number of nodes based on the neighboring node information, and for determining a probability of a collision between data transmissions, wherein said collision determination circuit determines that data transmissions are liable to collide when the number of nodes based on the neighboring node information is greater than the number of neighboring nodes related to the control of the data transmission timing.

8. The node in accordance with claim 7, wherein said apparatus further comprises a transmission/receipt control circuit for controlling an ability of at least one of transmitting and receiving the state variable signal when said collision determination circuit determines that data transmissions are liable to collide.

9. The node in accordance with claim 7, wherein said apparatus further comprises a transmission/receipt control circuit for controlling an ability of at least one of transmitting and receiving the data signal when said collision determination circuit determines that data transmissions are liable to collide.

10. A telecommunications system comprising a plurality of nodes constituting a telecommunications network, wherein each of the plurality of nodes includes a transmission timing control apparatus, said transmission timing control apparatus comprising:

a transmission timing determining circuit for receiving a state variable signal transmitted from neighboring one of the plurality of nodes to one of the plurality of nodes which is of interest, the state variable signal being affected by a phase representative of a data transmission timing of the neighboring node, said transmission timing determining circuit varying a state of a phase of the node of interest according to a rule to thereby determine a data transmission timing of the node of interest the rule changing a rhythm of a nonlinear oscillation of the phase of the node of interest in response to an impulse signal received from the neighboring node;

a node information transmitter/receiver fix transmitting source identification information particular to the node of interest and source node information of a data signal received by the node of interest, and for receiving node information transmitted from the neighboring node;

a neighboring node information collecting circuit operative in response to the source identification information and the source node information for collecting neighboring node information of the neighboring node having received the data signal; and a collision determination circuit for comparing a number of the neighboring nodes to which said transmission timing determining circuit is related as to control of the data transmission timing with a number of nodes based on the neighboring node information, and for determining a probability of a collision between data transmissions, wherein said collision determination circuit determines that data transmissions are liable to collide when the number of nodes based on the neighboring node information is greater than the number of neighboring nodes related to the control of the data transmission timing.

11. The system in accordance with claim 10, wherein said apparatus further comprises a transmission/receipt control circuit for controlling an ability of at least one of transmitting and receiving the state variable signal when said collision determination circuit determines that data transmissions are liable to collide.

12. The system in accordance with claim 10, wherein said apparatus further comprises a transmission/receipt control circuit for controlling an ability of at least one of transmitting and receiving the data signal when said collision determination circuit determines that data transmissions are liable to collide.

13. A method of controlling a transmission timing in a node constituting a telecommunications system, comprising the steps of:

determining a data transmission timing of a node of interest by receiving a state variable signal transmitted from one of a neighboring plurality of nodes to one of the plurality of nodes which is of interest and by varying a state of a phase of the node of interest according to a rule, the state variable signal being affected by a phase representative of a data transmission timing of the neighboring node, the rule changing a rhythm of a nonlinear oscillation of the phase of the node of interest in response to an impulse signal received from the neighboring node;

transmitting source identification information particular to the node of interest and source node information of a data signal received by the node of interest;

receiving node information transmitted from the neighboring node;

collecting, in response to the source identification information and the source node information, neighboring node information of the neighboring node having received the data signal; and determining a probability of a collision between data transmissions by comparing a number of the neighboring nodes to which said step of determining the transmission timing is related as to control of the data transmission timing with a number of nodes based on the neighboring node information, wherein said step of determining the probability determines that data transmissions are liable to collide when the number of nodes based on the neighboring node information is greater than the number of neighboring nodes related to the control of the data transmission timing.

14. The method in accordance with claim 13, further comprising the step of controlling an ability of at least one of transmitting and receiving the state variable signal when said step of determining the probability determines that data transmissions are liable to collide.

15. The method in accordance with claim 13, further comprising the step of controlling an ability of at least one of transmitting and receiving the data signal when said step of determining the probability determines that data transmissions are liable to collide.

16. A method of controlling a transmission timing in a node constituting a telecommunications system, comprising the steps of:

determining a data transmission timing of a node of interest by receiving a state variable signal transmitted from one of a neighboring plurality of nodes to one of the plurality of nodes which is of interest and by varying a state of a phase of the node of interest according to a rule, the state variable signal being affected by a phase representative of a data transmission timing of the neighboring node, the rule changing a rhythm of a nonlinear oscillation of the phase of the node of interest in response to an impulse signal received from the neighboring node;

transmitting source identification information particular to the node of interest and source node information of a data signal received by the node of interest;

receiving node information transmitted from the neighboring node;

collecting, in response to the source identification information and the source node information, neighboring node information of the neighboring node having received the data signal; and determining a probability of a collision between data transmissions by comparing a number of the neighboring nodes to which said step of determining the transmission timing is related as to control of the data transmission dining with a number of nodes based on the neighboring node information, said step of determining the data transmission timing comprising the substeps of:

receiving the state variable signal transmitted from the neighboring node;

transmitting the state variable signal to which the source identification information of the node of interest is added; and generating, in response to identification information of the neighboring node contained in the state variable signal received by said substep of receiving the state variable signal, interaction subject node information of an interaction subject node interactive in the phase of the node of interest, in said step of determining the probability, a number of nodes based on the interaction subject node information being compared with a number of nodes based on the neighboring node information to determine the probability of a collision between data transmissions, wherein said step of determining the probability determines that data transmissions are liable to collide when the number of nodes based on the neighboring node information is greater than the number of nodes based on the interaction subject node information.

17. The method in accordance with claim 16, further comprising the step of controlling an ability of at least one of transmitting and receiving the state variable signal when said step of determining the probability determines that data transmissions are liable to collide.

18. The method in accordance with claim 16, further comprising the step of controlling an ability of at least one of transmitting and receiving the data signal when said step of determining the probability determines that data transmissions are liable to collide.

19. A communication node constituting a telecommunications network together with another node and including a transmission timing control apparatus, said transmission timing control apparatus comprising:

a transmission timing determining circuit for receiving a state variable signal transmitted from one of a neighboring plurality of nodes to said communication node, the state variable signal being affected by a phase representative of a data transmission timing of the neighboring node, said transmission timing determining circuit varying a state of a phase of said communication node according to a rule to thereby determine a data transmission timing of said communication node, the rule changing a rhythm of a nonlinear oscillation of the phase of the communication node in response to an impulse signal received from the neighboring node;

a node information transmitter/receiver for transmitting source identification information particular to said communication node and source node information of a data signal received by said communication node, and for receiving node information transmitted from the neighboring node;

a neighboring node information collecting circuit operative in response to the source identification information and the source node information for collecting neighboring node information of the neighboring node having received the data signal; and a collision determination circuit for comparing a number of the neighboring nodes to which said transmission timing determining circuit is related as to control of the data transmission timing with a number of nodes based on the neighboring node information, and for determining a probability of a collision between data transmissions, said transmission timing determining circuit comprising:

a state variable signal receiver for receiving the state variable signal transmitted from the neighboring node;

a state variable signal transmitter for transmitting the state variable signal to which the source identification information of the communication node is added; and an interaction subject node information generator operative in response to identification information of the neighboring node contained in the state variable signal received by said state variable signal receiver for generating interaction subject node information of an interaction subject node interactive in the phase of the communication node;

said collision determination circuit comparing a number of nodes based on the interaction subject node information with a number of nodes based on the neighboring node information to determine the probability of a collision between data transmissions, wherein said collision determination circuit determines that data transmissions are liable to collide when the number of nodes based on the neighboring node information is greater than the number of nodes based on the interaction subject node information.

20. The node in accordance with claim 19, wherein said apparatus further comprises a transmission/receipt control circuit for controlling an ability of at least one of transmitting and receiving the state variable signal when said collision determination circuit determines that data transmissions are liable to collide.

21. The node in accordance with claim 19, wherein said apparatus further comprises a transmission/receipt control circuit for controlling an ability of at least one of transmitting and receiving the data signal when said collision determination circuit determines that data transmissions are liable to collide.

22. A telecommunications system comprising a plurality of nodes constituting a telecommunications network, wherein each of the plurality of nodes includes a transmission timing control apparatus, said transmission timing control apparatus comprising:

a transmission timing determining circuit for receiving a state variable signal transmitted from neighboring one of the plurality of nodes to one of the plurality of nodes which is of interest, the suite variable signal being affected by a phase representative of a data transmission timing of the neighboring node, said transmission timing determining circuit varying a state of a phase of the node of interest according to a rule to thereby determine a data transmission timing of the node of interest, the rule changing a rhythm of a nonlinear oscillation of the phase of the node of interest in response to an impulse signal received from the neighboring node;

a node information transmitter/receiver for transmitting source identification information particular to the node of interest and source node information of a data signal received by the node of interest, and for receiving node information transmitted from the neighboring node;

a neighboring node information collecting circuit operative in response to the source identification information and the source node information for collecting neighboring node information of the neighboring node having received the data signal; and a collision determination circuit for comparing a number of the neighboring nodes to which said transmission timing determining circuit is related as to control of the data transmission timing with a number of nodes based on the neighboring node information, and for determining a probability of a collision between data transmissions, said transmission timing determining circuit comprising:

a state variable signal receiver for receiving the state variable signal transmitted from the neighboring node;

a state variable signal transmitter for transmitting the state variable signal to which the source identification information of the node of interest is added; and an interaction subject node information generator operative in response to identification information of the neighboring node contained in the state variable signal received by said state variable signal receiver for generating interaction subject node information of an interaction subject node interactive in the phase of the node of interest;

said collision determination circuit comparing a number of nodes based on the interaction subject node information with a number of nodes based on the neighboring node information to determine the probability of a collision between data transmissions, wherein said collision determination circuit determines that data transmissions are liable to collide when the number of nodes based on the neighboring node information is greater than the number of nodes based on the interaction subject node information.

23. The system in accordance with claim 22, wherein said apparatus further comprises a transmission/receipt control circuit for controlling an ability of at least one of transmitting and receiving the state variable signal when said collision determination circuit determines that data transmissions are liable to collide.

24. The apparatus in accordance with claim 22, wherein said apparatus father comprises a transmission/receipt control circuit for controlling an ability of at least one of transmitting and receiving the data signal when said collision determination circuit determines that data transmissions are liable to collide.

* * * * *